United States Patent
Nammi et al.

(10) Patent No.: US 9,515,805 B2
(45) Date of Patent: Dec. 6, 2016

(54) CHANNEL QUALITY REPORTING IN A COMMUNICATIONS SYSTEM

(71) Applicant: Telefonaktiebolaget L M Ericsson (publ), Stockholm (SE)

(72) Inventors: Sairamesh Nammi, Kista (SE); Bo Göransson, Sollentuna (SE); Erik Larsson, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 87 days.

(21) Appl. No.: 14/400,264

(22) PCT Filed: May 7, 2013

(86) PCT No.: PCT/SE2013/050506
§ 371 (c)(1),
(2) Date: Nov. 10, 2014

(87) PCT Pub. No.: WO2013/169191
PCT Pub. Date: Nov. 14, 2013

(65) Prior Publication Data
US 2015/0098438 A1 Apr. 9, 2015

Related U.S. Application Data

(60) Provisional application No. 61/645,672, filed on May 11, 2012.

(51) Int. Cl.
H04L 5/00 (2006.01)
H04W 24/10 (2009.01)
H04W 76/04 (2009.01)
(Continued)

(52) U.S. Cl.
CPC ........... *H04L 5/0057* (2013.01); *H04L 1/0026* (2013.01); *H04L 1/1671* (2013.01); *H04L 5/0042* (2013.01); *H04L 5/0053* (2013.01);
(Continued)

(58) Field of Classification Search
None
See application file for complete search history.

(56) References Cited

U.S. PATENT DOCUMENTS

| | | | |
|---|---|---|---|
| 2008/0063115 A1* | 3/2008 | Varadarajan | H04B 7/0417 375/299 |
| 2008/0101321 A1 | 5/2008 | Cheng et al. | |
| 2012/0176947 A1* | 7/2012 | Xi | H04L 1/0026 370/311 |

FOREIGN PATENT DOCUMENTS

| | | |
|---|---|---|
| WO | 2008022243 A2 | 2/2008 |
| WO | 2008117984 A1 | 10/2008 |

(Continued)

OTHER PUBLICATIONS

Phillips, "CQI reporting when MIMO and CPC are both configured", 3GPP TSG-RAN WG1 meeting #49, Kobe, Japan, 7th-11th May 2007, R1-072388.*

(Continued)

*Primary Examiner* — Joseph Bednash
(74) *Attorney, Agent, or Firm* — Patent Portfolio Builders, PLLC

(57) ABSTRACT

The embodiments herein relate to a method in a user equipment for handling CSI in a communication system. The user equipment determines the CSI, based on information about a CPICH. The CSI comprises at least one of a CQI, a RI, a PCI and an HARQ ACK/NACK. The user equipment transmits the CSI multiplexed into a plurality of TTIs to the base station so that a first CQI-S is transmitted in one TTI and a second CQI-S or a DTX codeword is transmitted in another TTI. The second CQI-S corresponds to a second layer.

12 Claims, 14 Drawing Sheets

(51) Int. Cl.
    *H04L 1/00* (2006.01)
    *H04L 1/16* (2006.01)
(52) U.S. Cl.
    CPC ........... *H04W 24/10* (2013.01); *H04W 76/048* (2013.01); *H04L 5/0055* (2013.01)

(56) References Cited

FOREIGN PATENT DOCUMENTS

| WO | 2011100627 A1 | 8/2011 |
| WO | 2013113450 A1 | 8/2013 |
| WO | 2013169184 A2 | 11/2013 |

OTHER PUBLICATIONS

Ericsson: "Feedback Channel design for four branch MIMO system," 3GPP TSG-RAN WG1 #68bis, R1-121762, XP050600013, Mar. 26-30, 2012, pp. 3.
Office Action in EP application No. 13787133.1 mailed Feb. 12, 2016.
Ericsson, "R1-111763: 4-Branch MIMO for HSDPA," 3rd Generation Partnership Project (3GPP) TSG RAN WG1 Meeting #65, May 9-13, 2011, Barcelona, Spain, 17 pages.
Philips et al., "Tdoc R1-062680: CQI reporting for Rel-7 FDD MIMO," 3rd Generation Partnership Project (3GPP) TSG RAN WG1 Meeting #46bis, Oct. 9-13, 2006, Seoul, Korea, 4 pages.
Philips, "Tdoc R1-072388: CQI reporting when MIMO and CPC are both configured," 3rd Generation Partnership Project (3GPP) TSG RAN WG1 meeting #49, May 7-11, 2007, Kobe, Japan, 6 pages.
Ericsson, "R1-120361: Feedback Channel Design for Four Branch MIMO System," 3rd Generation Partnership Project (3GPP) TSG RAN WG1 Meeting #68, Feb. 6-10, 2012, Dresden, Germany, 7 pages.
Nokia Siemens Networks, "R1-121725: UL feedback design for 4-Tx MIMO," 3rd Generation Partnership Project (3GPP) TSG RAN WG1 Meeting #68bis, Mar. 26-30, 2012, Jeju, Korea, 4 pages.
International Search Report and Written Opinion for PCT/SE2013/050506, mailed Dec. 11, 2013, 13 pages.

\* cited by examiner

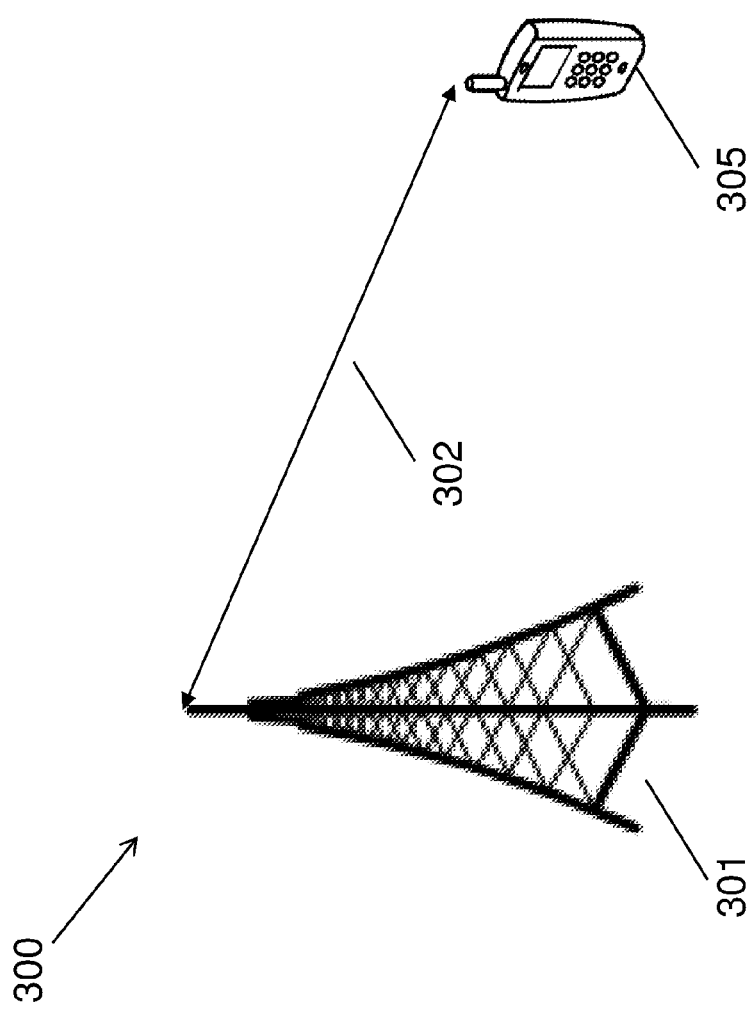

Fig. 5: HS-DPCCH structure for rank 1 transmissions

Fig. 6: HS-DPCCH structure for rank 2 transmissions

Fig. 7: HS-DPCCH structure for rank 3 transmissions

Fig. 8: HS-DPCCH structure for rank 4 transmissions

Fig. 9: HS-DPCCH structure for optimized for rank 2 transmissions

Fig. 10: Modified HS-DPCCH structure for rank 1 transmissions

CHANNEL QUALITY REPORTING IN A COMMUNICATIONS SYSTEM

This application is a 35 U.S.C. §371 national phase filing of International Application No. PCT/SE2013/050506, filed May 7, 2013, which claims priority to U.S. Provisional Application No. 61/645,672, filed May 11, 2012, the disclosures of which are incorporated herein by reference in their entireties.

TECHNICAL FIELD

Embodiments herein relate generally to a user equipment, a method in the user equipment, a base station and a method in the base station. More particularly the embodiments herein relate to handling Channel State Information (CSI) in a communication system.

BACKGROUND

In a typical cellular network, also referred to as a wireless communication system or a communications system, a User Equipment (UE), communicates via a Radio Access Network (RAN) to one or more Core Networks (CNs).

A user equipment is a device that may access services offered by an operator's core network and services outside the operator's network to which the operator's radio access network and core network provide access. The user equipment may be any device, mobile or stationary, enabled to communicate over a radio channel in a communications network, for instance but not limited to e.g. mobile phone, smart phone, tablet computer, sensors, meters, vehicles, household appliances, medical appliances, media players, cameras, Machine to Machine (M2M) device, or any type of consumer electronic, for instance but not limited to television, radio, lighting arrangements, tablet computer, laptop or Personal Computer (PC). The user equipment may be portable, pocket storable, hand held, computer comprised or vehicle mounted mobile devices, enabled to communicate voice and/or data, via the radio access network, with another entity.

The user equipment is enabled to communicate wirelessly in the communications system. The communication may be performed e.g. between two user equipments, between a user equipment and a regular telephone and/or between the user equipment and a server via the radio access network and possibly one or more core networks, comprised within the communications system.

The radio access network covers a geographical area which is divided into cell areas. Each cell area is served by a base station. In some radio access networks, the base station is also called e.g. Radio Base Station (RBS), evolved NodeB (eNB), NodeB or B node. A cell is a geographical area where radio coverage is provided by the base station at a base station site. Each cell is identified by an identity within the local radio area, which is broadcast in the cell. The base station communicates over an air interface operating on radio frequencies with the user equipment within range of the base station.

Standardised by the third Generation Partnership Project (3GPP), High Speed Downlink Packet Access (HSPA) supports the provision of voice services in combination with mobile broadband data services. HSPA comprises High Speed Downlink Packet Access (HSDPA), High Speed Uplink Packet Access (HSUPA) and HSPA+. HSDPA allows communication systems based on the Universal Mobile Telecommunications System (UMTS) to have higher data transfer speeds and capacity. In HSDPA, a new transport layer channel, High Speed-Downlink Shared CHannel (HS-DSCH), has been added to the UMTS release 5 and further specifications. It is implemented by introducing three new physical layer channels: High Speed-Shared Control Channel (HS-SCCH), Uplink High-Speed Dedicated Physical Control Channel (HS-DPCCH) and High Speed-Physical Downlink Shared Channel (HS-PDSCH). The HS-SCCH informs the user equipment that data will be sent on the HS-DSCH, two slots ahead. The HS-DPCCH carries acknowledgment information and a current Channel Quality Indicator (CQI) of the user equipment. This CQI value is then used by the base station to calculate the amount of data that should be sent to the user equipment in the next transmission. The HS-PDSCH is the channel mapped to the above HS-DSCH transport channel that carries actual user data. HSPA may recover fast from errors by using Hybrid Automatic Repeat reQuest (HARQ). HARQ is a technique that enables faster recovery from errors in communications systems by storing corrupted packets in the receiving device rather than discarding them. Even if retransmitted packets have errors, a good packet may be derived from the combination of bad ones.

Multiple Input Multiple Output (MIMO) refers to any communications system with multiple antennas at the transmitter and/or the receiver, and it is used to improve communication performance. The terms input and output refer to the radio channel carrying the signal, not to the devices having antennas. At the transmitter (Tx), multiple antennas may be used to mitigate the effects of fading via transmit diversity and to increase throughput via spatial division multiple access. At the receiver (Rx), multiple antennas may be used for receiver combining which provides diversity and for combining gains. If multiple antennas are available at both the transmitter and receiver, then different data streams may be transmitted from each antenna with each data stream carrying different information but using the same frequency resources. For example, using two transmit antennas, one may transmit two separate data streams. At the receiver, multiple antennas are required to demodulate the data streams based on their spatial characteristics. In general, the required minimum number of receiver antennas is equal to the number of separate data streams. 4×4 MIMO, also referred to as four branch MIMO, may support up to four data streams. In general, MIMO may be n×n MIMO, where n is the number of antennas and is positive integer. For example 2×2 MIMO, 8×8 MIMO, 16×16 MIMO etc.

Some terms will now be explained. A transport block holds the data that is going to be transmitted, and the transport block is converted into a codeword. A codeword may be defined as the number of transport blocks which have the same HARQ-process identifier. A codeword may be mapped to a number of layers. The term "layer" is synonymous with "stream." For MIMO, at least two layers must be used. The number of layers is always less than or equal to the number of antennas. Precoding modifies the layer signals before transmission. A transmission rank refers to the number of transmitted data stream.

Several new features are added for the long term HSPA evolution in order to meet the requirements set by the International Mobile Telecommunications-Advanced (IMT-A). The main objective of these new features is to increase the average spectral efficiency. Spectral efficiency is a measure of how efficiently a limited frequency spectrum is utilized. It refers to an information rate that may be transmitted over a given bandwidth in a specific communications system. One possible technique for improving downlink spectral efficiency may be to introduce support for four branch MIMO, i.e. to utilize up to four transmit and receive antennas to enhance the spatial multiplexing gains and to offer improved beam forming capabilities. Four branch MIMO provides up to 84 Mbps per 5 MHz carrier for high Signal to Noise Ratio (SNR) user equipments and improves the coverage for low SNR user equipments.

Spatial multiplexing mentioned above is a transmission technique in MIMO to transmit independently and separately encoded data signals, so-called data streams, from each of the multiple transmit antennas. Therefore, the space dimension is reused, or multiplexed, more than one time. If the transmitter has N_t antennas and the receiver has N_r antennas, the maximum spatial multiplexing order (the number of data streams) is:

$$N\_s = \min(N\_t, N\_r)$$

This means that N_s number of data streams may be transmitted in parallel, ideally leading to an N_s increase of the spectral efficiency (the number of bits per second and per Hz that may be transmitted over the wireless channel).

Channel feedback information, also referred to as CSI, enables a scheduler to decide which user equipments that should be served in parallel. The user equipment is configured to send at least one of the following three types of channel feedback information: a CQI, a Rank Indicator (RI) and a Pre-coding Matric Indicator (PMI). CQI is an important part of channel information feedback. The CQI provides the base station with information about link adaptation parameters which the user equipment supports at the time. The CQI is utilized to determine the coding rate and modulation alphabet, as well as the number of spatially multiplexed data streams. RI is the user equipment recommendation for the number of layers, i.e. the number of data streams to be used in spatial multiplexing. RI is only reported when the user equipment operates in MIMO mode with spatial multiplexing. The RI may have the values 1 or 2 in a 2×2 MIMO configuration i.e. one or two transmitted data streams. The RI may have the values from 1 and up to 4 in a 4×4 MIMO configuration. The RI is associated with a CQI report. This means that the CQI is calculated assuming a particular RI value. The RI typically varies more slowly than the CQI. PMI provides information about a preferred pre-coding matrix in a codebook based pre-coding. PMI is only reported when the user equipment operates in MIMO mode. The number of pre-coding matrices in the codebook is dependent on the number of antenna ports on the base station. For example, four antenna ports enables up to 64 matrices dependent on the RI and the user equipment capability. A Precoding Control Indicator (PCI) indicates a specific pre-coding vector that is applied to the transmit signal at the base station.

Introduction of four branch MIMO will require a new feedback channel structure to send the CQI and PCI information to the base station. To reduce the signalling overhead at the downlink and the uplink, it was recommended to use two codewords for four branch MIMO. For designing uplink signalling channel, i.e. HS-DPCCH, it was agreed to use a similar structure as that of two antenna MIMO, described in 3GPP release 7. When reporting CQI, RI and PCI, the CSI may be reported in two reporting intervals. This structure is attractive in terms that it requires minimal standards change. The performance with this structure is very close to that of ideal reporting. In general, the base station needs to wait for two reporting intervals to schedule the user equipment for data transmission. If the reporting period is configured to a high value, say for example 8 msec, the base station needs to wait 16 msec to schedule the user equipment. For a high speed user equipment, this introduces delay and the performance degradation is very severe.

An overview of channel quality reporting and base station procedures for two branch (2×2) MIMO (3GPP release 7 MIMO) will now be described with reference to FIG. 1. FIG. 1 shows the messages exchanged between base station 101 and the user equipment 105 during a typical data call set up. The method comprises the following steps, which steps may be performed in any suitable order:

Step 101

From the Common Pilot Indicator CHannel (CPICH), the user equipment 105 estimates the channel and computes the CQI and the PCI. The CPICH is a downlink channel broadcast by the base station with constant power and of a known bit sequence.

For two antennas, the CQI is computed as follows:

$$CQI = \begin{cases} 15 \times CQI_1 + CQI_2 + 31 & \text{when 2 } \textit{transportblocks} \text{ are preferred by } \textit{theuser} \text{ equipment} \\ CQI_S & \text{when 1 } \textit{transportblock} \text{ is preferred by } \textit{theuser} \text{ equipment} \end{cases}$$

Where the CQI is the channel quality per individual layer. $CQI_1$ is the CQI corresponding to the first layer $CQI_2$ is the CQI corresponding to the second layer $CQI_S$ is the CQI for the single stream. 31 is the offset factor.

It can be observed from equation above that if the CQI is less than 31, the rank information is 1, otherwise the rank information is 2. The PCI is the precoding information bits selected in the subset of the codebook corresponding to the rank information.

Step 102

The information computed in step 101, i.e. the CQI and PCI, along with a HARQ ACK/NACK is reported to the base station 105 using the HS-DPCCH. The periodicity of HS-DPPCH is one sub-frame (e.g. 2 msec).

The structure of the HS-DPCCH is shown in FIG. 2a and FIG. 2b. FIG. 2a shows an example of how the PCI and the CQI are located in the structure. As well-known, the HS-DPCCH sub-frame structure comprises one slot for HARQ ACK/NACK transmissions and two slots for CQI/PCI transmissions. In the following, even though the text or the drawings may refer to a HARQ ACK, it is appreciated that this may also be a HARQ NACK.

The HS-DPCCH sub-frame structure in FIG. 2a for the TTI=2 ms comprises a field comprising a HARQ ACK or NACK. TTI is short for Transmission Time Interval. The HARQ ACK/NACK notifies the base station 105 whether or not the user equipment 101 has received the correct downlink data. The HARQ ACK/NACK field defines like this: 1-NACK, 0-ACK. The CQI reflects the PCI based on CPICH strength. Each sub-frame comprises a HARQ ACK/NACK, two CQI fields and one PCI field. In other words, every sub-frame comprises the same fields.

The HS-DPCCH in 3GPP release 5 to release 9 is based on a 1×SF256 solution. The structure of the HS-DPCCH is shown in FIG. 2b. As well-known, the HS-DPCCH sub-frame structure comprises one slot for HARQ ACK/NACK transmissions and two slots for CQI/PCI transmissions. This structure should also be used for four branch MIMO.

HARQ Details: For 3GPP release 7 MIMO the HARQ ACK/NACK codebook comprises six codewords plus the PRE/POST.

CQI/PCI Details: In 3GPP release 7 there are 5 or 2×4 bits allocated for describing the CQI depending on the CQI type. There are 30 or 15 CQI values per stream for rank 1 and rank 2, respectively, and the rank is implicitly signalled via the CQI. Furthermore, CQIs for each data stream are signalled independently of each other. In addition to the CQI bits there are two bits allocated for signalling the preferred pre-coding information. The 7 (or 10) information bits are then encoded into 20 channel bits that are transmitted during the second and third slot.

Returning to FIG. 1.

Step 103

Once the base station 101 receives the complete CQI, PCI and HARQ ACK/NACK, it allocates the required channelization codes, modulation and coding, precoding channel index to the user equipment 105 after scheduling.

Step 104

Information about the required channelization codes, modulation and coding, precoding channel index from step 103 is transmitted to the user equipment 105 using the HS-SCCH.

Step 105

When the user equipment 105 has received the information in step 105, the user equipment 105 detects the HS-SCCH.

Step 106

Once the user equipment 105 has detected the HS-SCCH, the downlink transmission starts through data traffic channel using the HS-PDSCH.

In general, HS-DPCCH design depends on many factors like number of codewords supported, number of HARQ processes, precoding codebook etc. Four branch MIMO should support two codewords and two HARQ processes.

The current HSDPA system (3GPP release 7-10) supports one or two transmit antennas at the base station 101. For these systems, from channel sounding, the user equipment 105 measures the channel and reports the channel state information in one sub-frame. A sub-frame may be defined as for example one TTI which may be e.g. 1 ms or 2 ms. Typically this channel state information report comprises the CQI which explicitly indicates the RI and the PCI. The user equipment sends this report periodically for every sub-frame, i.e. for every TTI to the base station. Once the base station receives this report it grants the Modulation and Coding Scheme (MCS), number of codes, rank and the PCI to each specific user equipment based on the scheduler metric. Based on this information, the base station may optimize the downlink throughput for each TTI.

Introduction of four branch MIMO will require a new feedback channel structure to send the CQI and PCI information to the base station 101. To reduce the signalling overhead at downlink and uplink, two codewords should be used for four branch MIMO. For designing uplink signalling channel (i.e. H-DPCCH), a similar structure that of two antenna MIMO (3GPP release 7) should be used. The structure for reporting CQI, RI and PCI is attractive in terms that it requires minimal standards change. However, this structure is not optimized for lower rank transmissions as for rank 1 and rank 2 because the CQI reported in the second reporting interval is redundant.

SUMMARY

An object of the embodiments herein is therefore to obviate at least one of the above disadvantages and to provide improved scheduling of user equipment in a communications system.

According to a first aspect, the object is achieved by a method in a user equipment for handling CSI in a communication system. The user equipment determines CSI based on information about a CPICH. The CSI comprises at least one of a CQI, a RI, a PCI and an HARQ ACK/NACK. The user equipment transmits the CSI multiplexed into a plurality of TTIs to the base station, so that a first CQI-S is transmitted in one TTI and a second CQI-S or a Discontinuous Transmission (DTX) codeword is transmitted in another TTI, enabling the base station to schedule the user equipment. The second CQI-S corresponds to a second layer/codeword.

According to a second aspect, the object is achieved by a user equipment for handling CSI in a communication system. The user equipment comprises a processor configured to determine the CSI based on information about a CPICH. The CSI comprises at least one of a CQI, a RI, a PCI and a HARQ ACK/NACK. The user equipment comprises a transmitter configured to transmit the CSI multiplexed into a plurality of TTIs to the base station, so that a first CQI-S is transmitted in one TTI and a second CQI-S or a DTX codeword is transmitted in another TTI. The second CQI-S corresponds to a second layer/codeword.

According to a third aspect, the object is achieved by a method in a base station for handling CSI in a communication system. The base station receives CSI from the user equipment over a plurality of TTIs. The CSI comprises at least one of a CQI, a RI, a PCI, and a HARQ ACK/NACK, so that a first CQI-S is received in one TTI and a second CQI-S or a DTX codeword is received in another TTI. The base station schedules the user equipment based on the received CSI. The second CQI-S corresponds to a second layer/codeword.

According to a fourth aspect, the object is achieved by a base station for handling CSI in a communication system. The base station comprises a receiver configured to receive CSI from the user equipment over a plurality of TTIs. The CSI comprises at least one of a CQI, a RI, a PCI and a HARQ ACK/NACK, so that a first CQI-S is received in one TTI and a second CQI-S or a DTX codeword is received in another TTI. The base station comprises a scheduler configured to schedule the user equipment based on the received CSI. The second CQI-S corresponds to a second layer/codeword.

Since the user equipment uses a feedback channel structure which is optimized for rank 1 and rank 2 transmissions the scheduling of the user equipment in the communications system is improved.

Embodiments herein afford many advantages, of which a non-exhaustive list of examples follows:

The embodiments herein have an advantage of improving the downlink spectral efficiency and increasing the average spectral efficiency.

Another advantage of the embodiments herein is that it enhances the spatial multiplexing gains and improves beam forming capabilities The embodiments herein provide an advantage of that it requires minimal standard changes as it may be used for four branch MIMO feedback channel design.

The user equipment may be scheduled after the first CSI report rather than waiting for the complete channel state information in two reporting intervals, thereby reducing the potential delay of one sub-frame delay. This gives an advantage of significant improvement for delay sensitive data applications.

An advantage of the embodiments herein is that existing functionality is re-used as far as possible.

The embodiments herein provide an advantage of being beneficial for lower ranks as the CQI granularity is more.

One advantage of the embodiments herein is that four branch MIMO is used in combination with downlink multi-carrier operation over 1-4 carriers.

Another advantage is that it is possible to operate four branch MIMO in combination with a single uplink carrier if applied with downlink multi-carrier operation.

On advantage of the embodiments herein is that they provide a well-performing solution while at the same time trying to re-use existing solutions, e.g. multicarrier, when designing HS-DPCCH for 4×4 DL MIMO. One example is that it would be beneficial to re-use available codebooks if possible.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIG. 3 is a schematic block diagram illustrating embodiments of a communications system.

Figure 1:
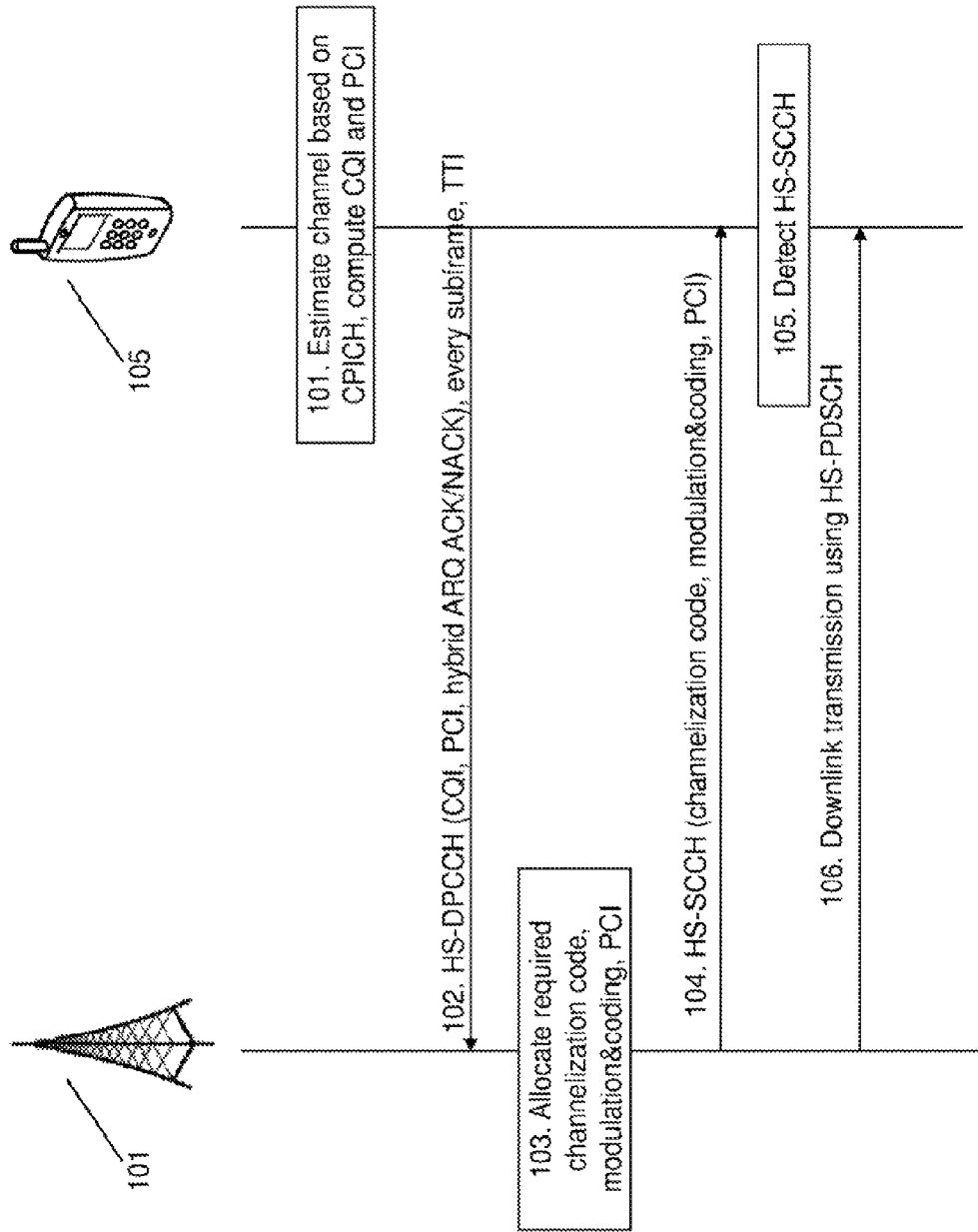
FIG. 1 is a signalling diagram illustrating embodiments of a method.
Figure 2A:
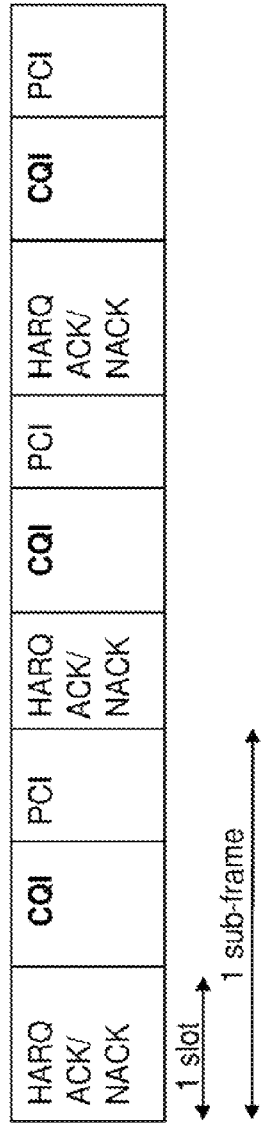
FIG. 2a-b are schematic block diagrams illustrating embodiments of a HS-DPCCH structure.
Figure 2B:
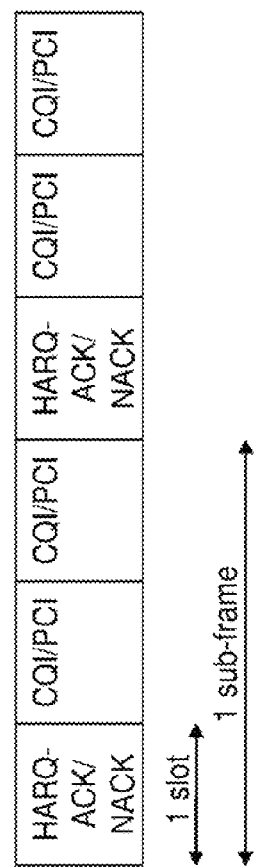

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to optimizing the HS-DPCCH structures for rank 1 and rank 2 transmissions. Rank 1 and rank 2 are considered to be lower ranks. In other words, the embodiments herein optimize the design for lower ranks.

FIG. 3 depicts a communications system 300 in which embodiments herein may be implemented. The communications system 300 may in some embodiments apply to one or more radio access technologies such as for example Long Term Evolution (LTE), LTE Advanced, Wideband Code Division Multiple Access (WCDMA), HSPA, Global System for Mobile Communications (GSM), or any other 3GPP radio access technology or other radio access technologies such as Wireless Local Area Network (WLAN). The communications system 300 is a multi-transmit antenna system, such as e.g. a four-way transmit antenna system, an eight-way transmit antenna system, a sixteen-way transmit antenna system etc.

The wireless communications system 300 comprises at least one base station 301 serving a cell. The base station 301 may be a base station such as a NodeB, an eNodeB, a pico node, a WLAN wireless access point/router or any other network unit capable to communicate over a radio carrier 302 with a user equipment 305 being present in the cell.

The user equipment 305 may be any device, mobile or stationary, enabled to communicate over the radio channel 302 in the communications system 300, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC. The user equipment 305 is referred to as UE in some of the figures.

As mentioned above, the communications system 300 is a multi-transmit antenna system. For example, in a four way system, all four antennas may be comprised in the base station 301. In another example of a four way system, two antennas are comprised in the base station 301 and the other two antennas are comprised in another base station (not shown in FIG. 3). So the transmit antennas may be located at different locations, i.e. at different base stations.

CQI for four branch MIMO with two codewords will now be described. Even though the following text uses four branch MIMO as an example, it is also valid for any other type of MIMO, such as e.g. 8×8 and 16×16. The method for enabling a base station 301 to schedule the user equipment 305 in a communication system 300 according to some embodiments will now be described with reference to the combined signalling diagram and flowchart depicted in FIG. 4. The method comprises the following steps, which steps may as well be carried out in another suitable order than described below:

Step 401

From the CPICH, the user equipment 305 estimates or measures the radio carrier 302 and computes the CSI which may comprise at least one of the CQI, the RI and the PCI. The CPICH is a downlink channel broadcast by the base station 301 with constant power and of a known bit sequence. The CPICH may be a Demodulation-CPICH (D-CPICH) or any other suitable type of CPICH as understood by the skilled person.

For two antennas, the CQI may be computed as follows:

$$CQI = \begin{cases} 15 \times CQI_1 + CQI_2 + 31 & \text{when 2 } transportblocks \text{ are preferred by } the UE \\ CQI_S & \text{when 1 } transportblock \text{ is preferred by } the UE \end{cases}$$

Where the CQI is the channel quality per individual layer. $CQI_1$ is the CQI corresponding to the first layer $CQI_2$ is the CQI corresponding to the second layer $CQI_S$ is the CQI for the single stream. 31 is the offset factor.

The user equipment 305 may store the CSI for example in a memory 1305.

Step 402

For the four branch MIMO with two HARQ process, the user equipment 305 informs the base station 301 periodically about the following parameters through the feedback channel, e.g. an uplink signalling channel such as the HS-DPCCH:

- HARQ ACK information—The same structure as that of 3GPP release 7.
- CQI per codeword—Since two codewords are defined in the standard, two codewords are needed (5 bits each). For two HARQ processes, two CQIs are needed, the same as that of 3GPP release 7. The CQI tables of 3GPP release 7 may be reused. For two HARQ processes, two CQIs which are the same as that of 3GPP release 7 is necessary. Hence, in total 8 bits are necessary for the two CQIs. It is possible to reuse the CQI tables of 3GPP release 7.
- RI—Indicates the number of layers the user equipment 305 prefers (e.g. 2 bits). Since up to four data streams are possible, it is recommended to use two dedicated bits for indicating rank information if the parameter RI is conveyed explicitly.
- PCI—Precoding Control Indicator in the RI (4 bits). This is because it has been decided to use a LTE release 8 precoder. Hence, 4 bits are used to indicate the precoding weights per each rank.

Figure 5:
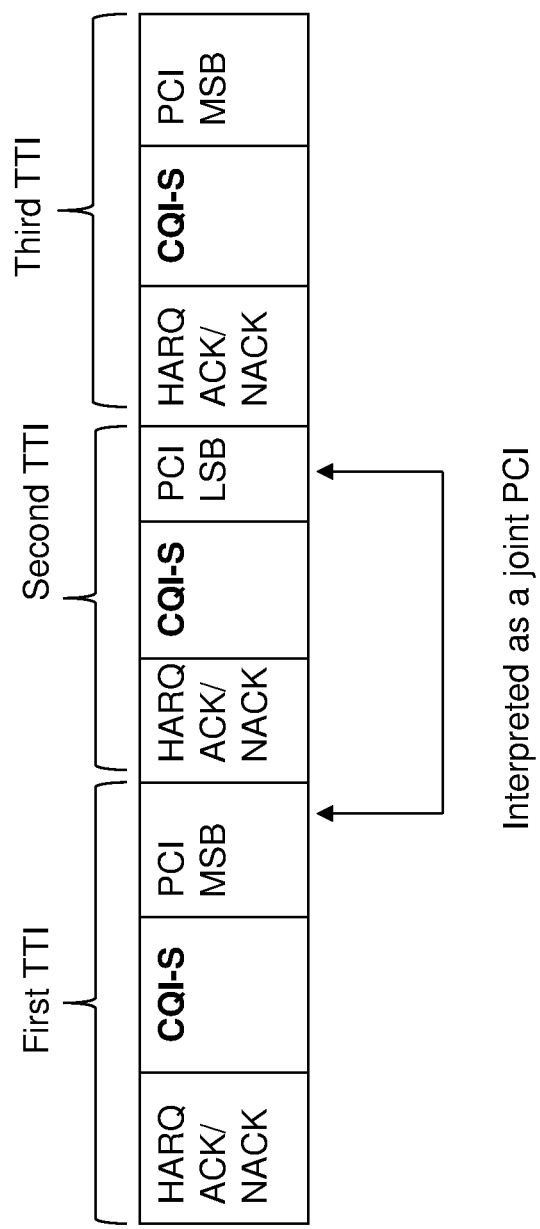
FIG. 5 is a schematic block diagrams illustrating embodiments of a HS-DPCCH structure for a rank 1 transmission.

FIG. 5 illustrates an example of the HS-DPCCH structure for a rank 1 transmission with time multiplexed PCI. Note that the rank information is conveyed explicitly. The first TTI, which also may be referred to as a first reporting interval or a first CSI report, comprises the HARQ ACK/NACK, the CQI-Single stream (CQI-S) and the PCI Most Significant Bit (MSB). The PCI MSB indicates the most significant bits of the PCI. The second TTI, also referred to as a second reporting interval or second CSI report, comprises the HARQ ACK/NACK, CQI-S and the PCI Least Significant Bit (LSB). The PCI LSB indicates the lease significant bits of PCI. Thus, the PCI is time multiplexed over two TTIs, but is still interpreted as a joint PCI. Note that CQI-S refers to the single data stream and corresponds to the CQI value less than 31. The third TTI, also referred to as a third reporting interval or third CSI report, comprises the HARQ ACK/NACK, the CQI-S and the PCI MSB. Also note that PCI is reported in two reporting intervals.

Figure 6:
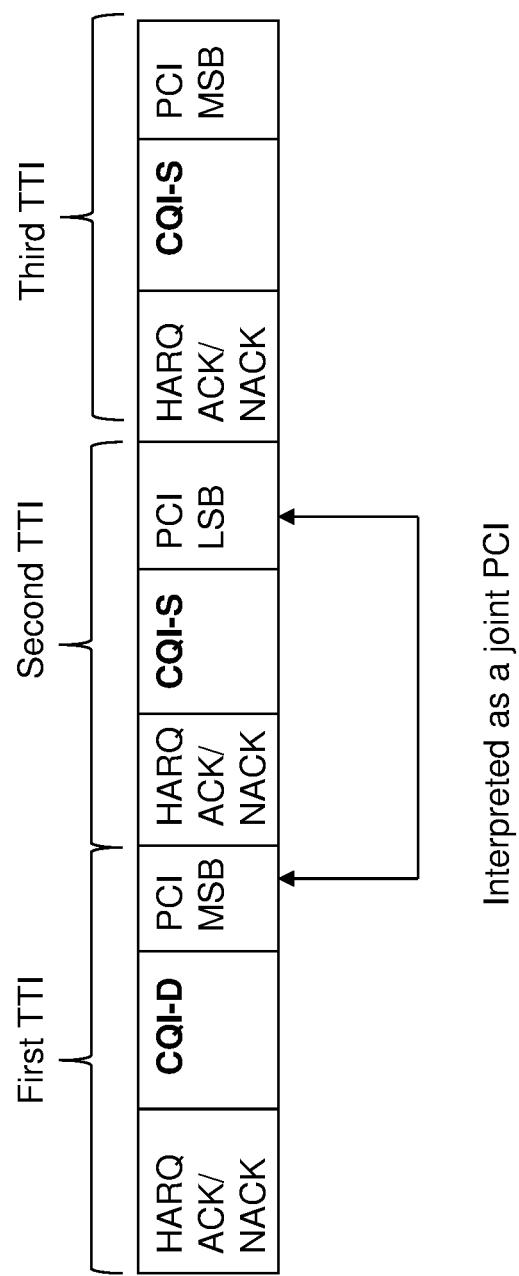
FIG. 6 is a schematic block diagrams illustrating embodiments of a HS-DPCCH structure for a rank 2 transmission.

FIG. 6 illustrates an example of the HS-DPCCH structure for a rank 2 transmission. The first TTI comprises the HARQ ACK/NACK, the CQI Dual stream (CQI-D) and the PCI MBS. The PCI MSB indicates the most significant bits of the PCI. The CQI-D indicates the dual stream, and corresponds to the CQI value greater than 31. The second TTI comprises the HARQ ACK/NACK, CQI-S and the PCI LSB. The PCI LSB indicates the lease significant bits of PCI. Thus, the PCI is time multiplexed over two TTIs, but still interpreted as a joint PCI. Note that CQI-S refers to the single stream and corresponds to the CQI value less than 31. The third TTI, also referred to as a third reporting interval or third CSI report, comprises the HARQ ACK/NACK, the CQI-S and the PCI MSB.

Figure 7:
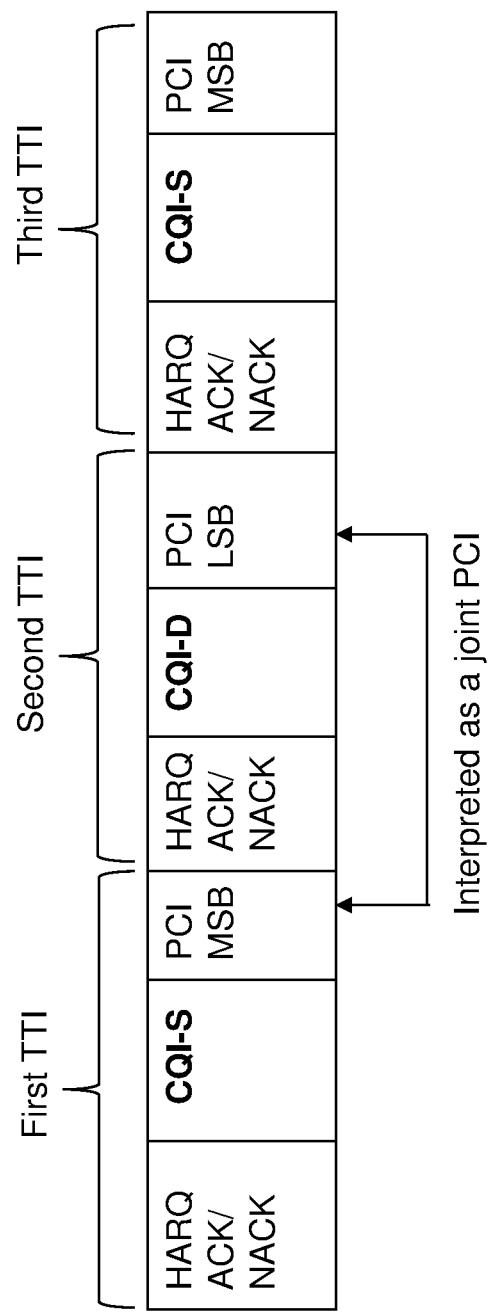
FIG. 7 is a schematic block diagrams illustrating embodiments of a HS-DPCCH structure for a rank 3 transmission.

FIG. 7 illustrates an example of the HS-DPCCH structure for a rank 3 transmission. The first TTI comprises the HARQ ACK/NACK, the CQI-S and the PCI MBS. The PCI MSB indicates the most significant bits of the PCI. The CQI-S indicates the single stream, and corresponds to the CQI value less than 31. The second TTI comprises the HARQ ACK/NACK, CQI-D and the PCI LSB. The PCI LSB indicates the lease significant bits of PCI. Thus, the PCI is time multiplexed over two TTIs, but is still interpreted as a joint PCI. Note that CQI-D refers to the dual stream and corresponds to the CQI value greater than 31. The third TTI, also referred to as a third reporting interval or third CSI report, comprises the HARQ ACK/NACK, the CQI-S and the PCI MSB.

Figure 8:
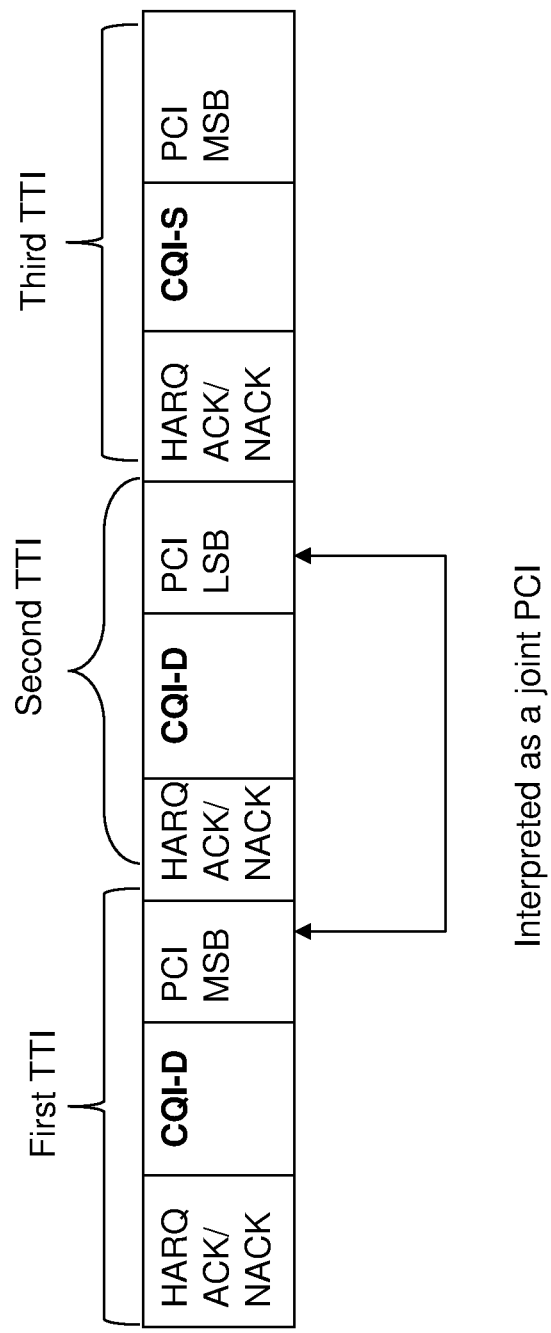
FIG. 8 is a schematic block diagrams illustrating embodiments of a HS-DPCCH structure for a rank 4 transmission.

FIG. 8 illustrates an example of the HS-DPCCH structure for a rank 4 transmission. The first TTI comprises the HARQ ACK/NACK, the CQI-D and the PCI MBS. The PCI MSB indicates the most significant bits of the PCI. The CQI-D indicates the dual stream, and corresponds to the CQI value greater than 31. The second TTI comprises the HARQ ACK/NACK, CQI-D and the PCI LSB. The PCI LSB indicates the least significant bits of PCI. Thus, the PCI is time multiplexed over two TTIs, but is still interpreted as a joint PCI. The third TTI, also referred to as a third reporting interval or third CSI report, comprises the HARQ ACK/NACK, the CQI-S and the PCI MSB. Note that CQI-S refers to the single stream and corresponds to the CQI value less than 31.

Figure 9:
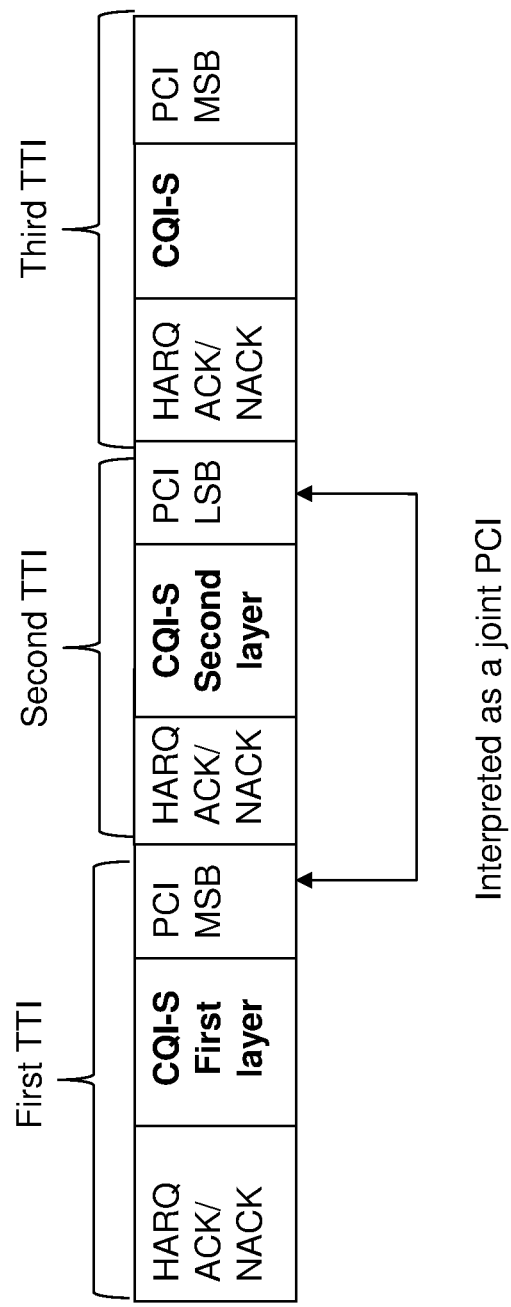
FIG. 9 is a schematic block diagram illustrating embodiments of a HS-DPCCH structure optimized for rank 2 transmissions.

FIG. 9 depicts an embodiment for a HS-DPCCH structure optimized for rank 2 transmissions. Note that the main motivation of this structure is instead of sending the complete CQI-S in the second reporting interval; individual CQI-S' are used in the two reporting intervals. In other words, in the first reporting interval, i.e. the first TTI, the user equipment 305 sends the CQI corresponding to the first layer/codeword, and in the second reporting interval, i.e. the second TTI, the user equipment 305 sends the CQI corresponding to the second layer/codeword. The advantage of this is that five bits are used to represent the CQI for rank 2 transmissions, hence more granularity. Four bits may be used for CQI granularity. The third TTI is in FIG. 9 exemplified to comprise the HARQ ACK/NACK, CQI-S and PCI MBS. However the third TTI may comprise any other suitable parameters.

Figure 10:
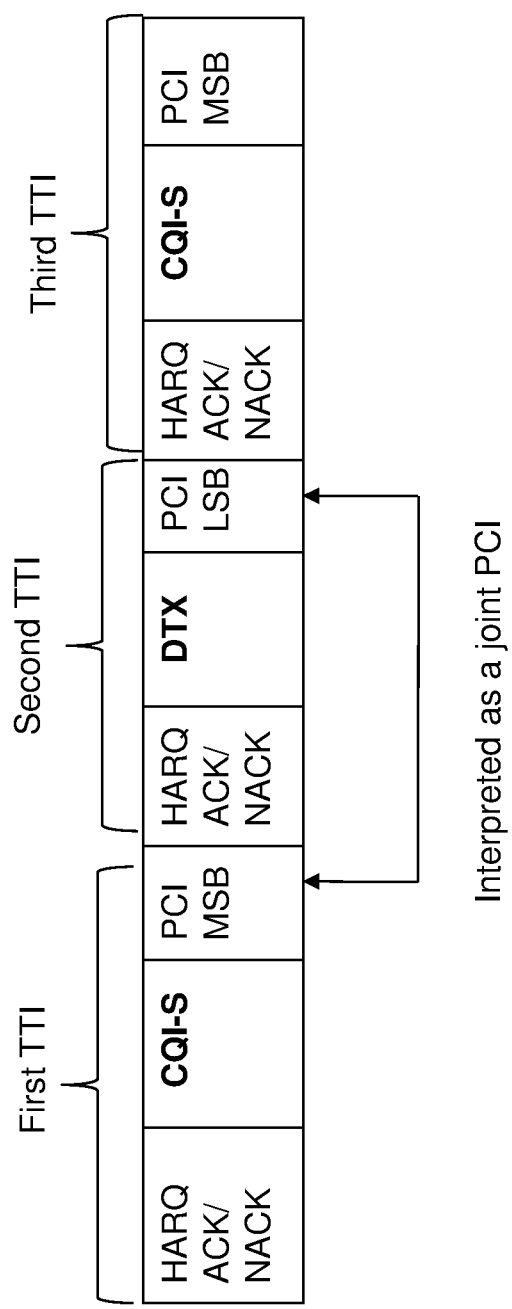
FIG. 10 is a schematic block diagram illustrating embodiments of a modified HS-DPCCH structure for rank 1 transmissions.

Observe that the HS-DPCCH structure optimized for the rank 2 transmission is equivalent to that of rank 1 transmissions as seen in FIG. 1. Hence to differentiate the optimized structure for rank 2 transmissions the DTX codeword/dummy codeword is sent in the second reporting intervals as seen in FIG. 10. Observe that sending the DTX dummy does not impact the performance for rank 1 transmissions as the information is anyhow redundant. DTX is a method of momentarily powering-down, or muting, a user equipment 305 when there is no input to the user equipment 305. This optimizes the overall efficiency of the communications system 300. In FIG. 10, the first III comprises a HARQ ACK/NACK, a CQI-S and a PCI MBS. The second III comprises a HARQ ACK/NACK, a DTX and a PCI LSB. The third III comprises a HARQ ACK/NACK, a CQI-S and a PCI MBS. The third III may comprise any other parameters than the ones used as an example in FIG. 10.

Returning to FIG. 4.

Step 403

Once the base station 301 has received the CSI information in the first TTI, the base station 301 starts to schedule the user equipment 305, i.e. it schedules the transport blocks, modulation and coding scheme, precoding control index for the user equipment 305. As mentioned above, ideally, the base station 301 needs two TTIs to schedule the user equipment 305 as only after two TTIs, the base station 301 gets the complete channel state information. Instead of waiting for getting the complete CSI from the user equipment 305, the base station 301 starts scheduling the user equipment 305 after receiving the first TTI. In the first TTI, the base station 301 has only received the PCI MSB, but it will choose a random PCI LSB within the subset indicated by the RI. The random chosen PCI may not be exactly the same as the original PCI LSB, which will be received in the second TTI. However, the impact due to the PCI error is minimal.

Step 404

The information about the transport blocks, modulation and coding scheme, precoding control index from step 403 is transmitted from the base station 301 to the user equipment 305 using the HS-SCCH.

Step 405

The user equipment 305 detects the HS-SCCH and the information transmitted in step 404.

Step 406

Once the user equipment 305 has detected the HS-SCCH, the downlink transmission from the base station 301 starts through the data traffic channel using the HS-PDSCH.

Note that although the description above assumes that the four branch MIMO is applied to a single downlink carrier it is straightforward to extend the embodiments to scenarios where a four branch MIMO is used in combination with multi-carrier HSDPA operation.

Figure 11:
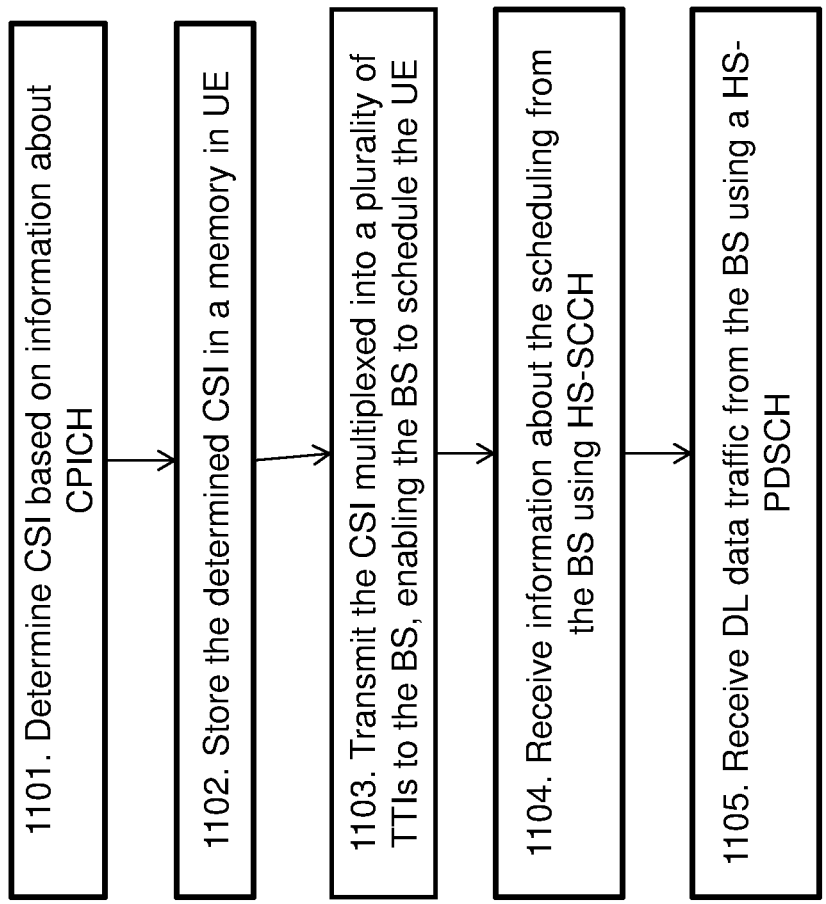
FIG. 11 is a flow chart illustrating embodiments of a method in a user equipment.

The method described above will now be described seen from the perspective of the user equipment 305. FIG. 11 is a flowchart describing the present method in the user equipment 305 for handling CSI in a communication system 300. The base station 301 is connected to the user equipment 305 via a radio carrier 302. The radio carrier 302 may be a single downlink carrier or a multi-carrier. The communication system 300 may be an n-way transmit antenna system. n is a positive integer larger than one. In some embodiments, the communication system 300 is a four-way transmit antenna system. In some embodiments, the communications system 300 is a HSDPA system. The method comprises the following steps to be performed by the user equipment 305, which steps may be performed in any suitable order than described below:

Step 1101

Figure 4:
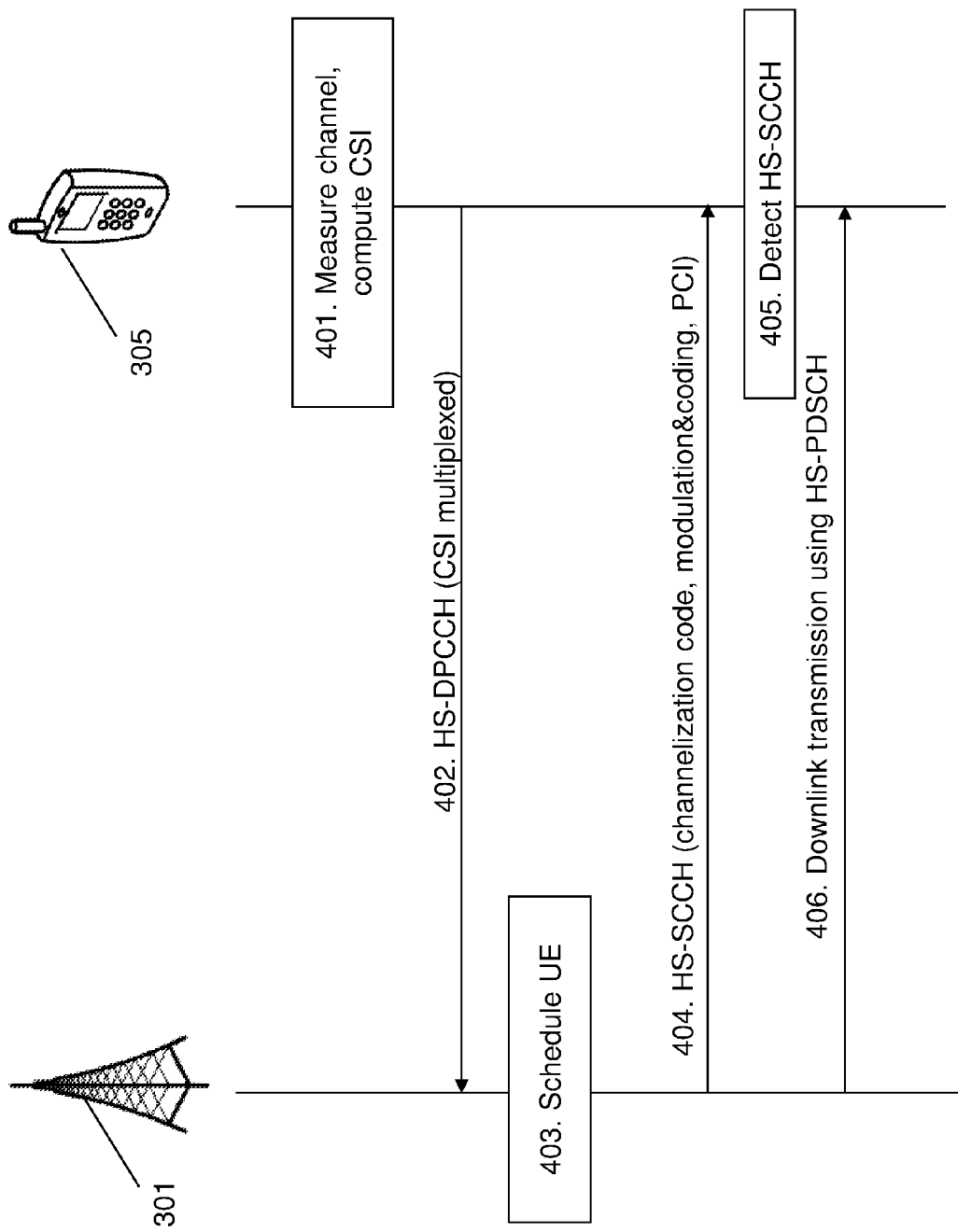
FIG. 4 is a signalling diagram illustrating embodiments of a method.

This step corresponds to step 401 in FIG. 4. The user equipment 305 determines CSI based on information about a CPICH. The CSI comprises at least one of a CQI, a RI, a PCI, and a HARQ ACK/NACK.

Step 1102

In some embodiments, the user equipment 305 stores the determined CSI in a memory 1305 comprised in the user equipment 305.

Step 1103

This step corresponds to step 402 in FIG. 4. The user equipment 305 transmits, to the base station 301, the CSI multiplexed into a plurality of TTIs such that a first CQI-S is transmitted in one TTI and a second CQI-S or a DTX codeword is transmitted in another TTI, thereby enabling the base station 301 to schedule the user equipment 305. The second CQI-S corresponds to a second layer/codeword. The CSI multiplexed into a plurality of TTIs and transmitted to the base station 301 may be the stored CSI. The TTI may be a sub-frame.

In some embodiments, the first CQI-S is a first CQI-S corresponding to a first layer when it is the second CQI-S that is transmitted in the other TTI for a rank 2 transmission, so that the first CQI-S and the second CQI-S are transmitted in different TTIs.

In some embodiments, the first CQI-S corresponding to the first layer is transmitted in a first TTI and the second CQI-S corresponding to the second layer/codeword is transmitted in a second TTI.

In some embodiments, the first CQI-S and the second CQI-S are each a CQI single stream.

The first CQI-S and the second CQI-S may be transmitted using five bits for rank 2 transmissions.

In some embodiments, the first CQI-S is a complete CQI-S when it is the DTX codeword that is transmitted in the other TTI for a rank 1 transmission.

The CSI may be transmitted to the base station 301 using a HS-DPCCH.

Step 1104

This step corresponds to step 404 in FIG. 4. In some embodiments, the user equipment 305 receives information about the scheduling from the base station 301 using the HS-SCCH.

Step 1105

This step corresponds to step 406 in FIG. 4. In some embodiments, the user equipment 305 receives downlink data traffic from the base station 301 using the HS-PDSCH.

Figure 12:
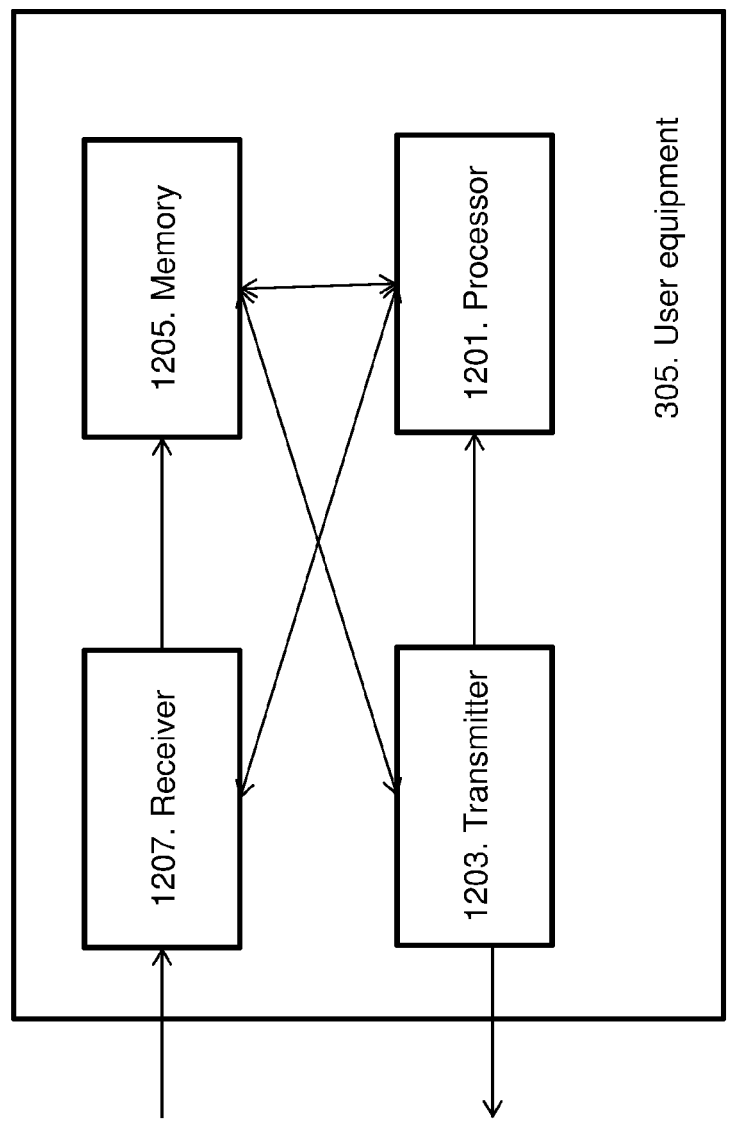
FIG. 12 is a flow chart illustrating embodiments of a user equipment.

To perform the method steps shown in FIG. 11 for handling CSI in a communication system 300 comprises an arrangement as shown in FIG. 12. As mentioned earlier, the user equipment 305 is configured to be connected to the base station 301 via a radio carrier 302. The communication system 300 may be an n-way transmit antenna system, wherein n is a positive integer larger than one. The communication system 300 may be a four-way transmit antenna system. The radio carrier 302 may be a single downlink carrier or a multi-carrier. The communications system 300 may be a HSDPA system.

The user equipment 305 comprises a processor 1201 which is configured to determine CSI based on information about a CPICH. The CSI comprises at least one of a CQI, a RI, a PCI and a HARQ ACK/NACK. In some embodiments, the processor 1301 is further configured to update the determined CSI. The processor 1301 may comprise Radio Frequency (RF) circuitry and baseband processing circuitry (not shown).

The user equipment 305 comprises a transmitter 1203 which is configured to transmit the CSI multiplexed into a plurality of TTIs to the base station 301 so that a first CQI-S is transmitted in one TTI and a second CQI-S or a DTX codeword is transmitted in another TTI, enabling the base station 301 to schedule the user equipment 305. The second CQI-S corresponds to a second layer/codeword. In some embodiments, the first CQI-S is a first CQI-S corresponding to a first layer when it is the second CQI-S that is transmitted in the other TTI for a rank 2 transmission, and so that the first CQI-S and the second CQI-S are transmitted in different TTIs. In some embodiments, the first CQI-S corresponding to the first layer is transmitted in a first TTI and the second CQI-S corresponding to the second layer/codeword is transmitted in a second TTI. In some embodiments, the first CQI-S and the second CQI-S are each a CQI single data stream. In some embodiments, the first CQI-S and the second CQI-S is transmitted using five bits for rank 2 transmissions. In some embodiments, the first CQI-S transmitted in the one TTI is a complete CQI-S when the DTX codeword is transmitted in a second TTI. The DTX codeword may be transmitted in the second TTI for a rank 1 transmission. In some embodiments, the CSI multiplexed into a plurality of TTIs and transmitted to the base station 301 is the stored CSI. In some embodiments, the CSI is transmitted to the base station 301 using a HS-DPCCH. The TTI may be a sub-frame.

The user equipment 305 may further comprise a memory 1205 comprising one or more memory units. The memory 1305 is arranged to be used to store data, received data streams, determined CSI, updated CSI, CPICH, received information about scheudlings, received downlink data traffic, threshold values, time periods, configurations, schedulings, and applications to perform the methods herein when being executed in the user equipment 305.

In some embodiments, the user equipment 305 comprises a receiver 1207 which is configured to receive information about the scheduling from the base station 301 using the HS-SCCH. The receiver 1207 is further configured to receive downlink data traffic from the base station 301 using the HS-PDSCH.

Those skilled in the art will also appreciate that the receiver 1207 and the transmitter 1203 described above may refer to a combination of analog and digital circuits, and/or one or more processors configured with software and/or firmware, e.g. stored in the memory 1205, that when executed by the one or more processors such as the processor 1201 perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Figure 13:
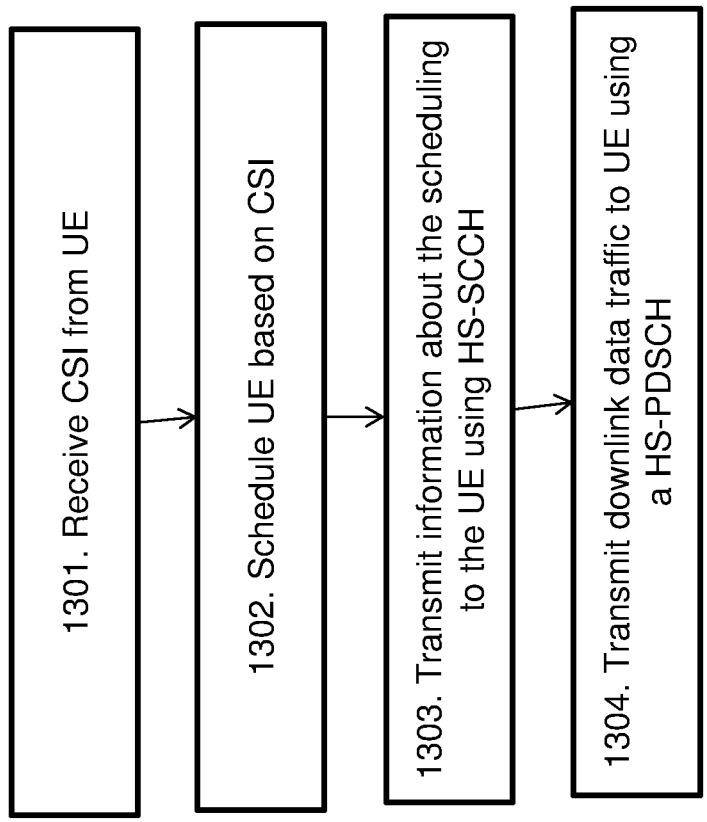
FIG. 13 is a flow chart illustrating embodiments of a method in a base station.

The method described above will now be described seen from the perspective of the base station 301. FIG. 13 is a flowchart describing the present method in the base station 301 for handling CSI in a communication system 300. The radio carrier 302 may be a single downlink carrier or a multi-carrier. The communications system 300 may be a HSDPA system. The communication system 300 may be a four-way transmit antenna system. In some embodiments, the communication system 300 is an n-way transmit antenna system, wherein n is a positive integer larger than one. The method comprises the following steps to be performed by the base station 301, which steps may be performed in any suitable order:

Step 1301

This step corresponds to step 402 in FIG. 4. The base station 301 receives CSI from the user equipment 305 multiplexed over a plurality of TTIs. The CSI comprises at least one of a CQI, a RI, a PCI and a HARQ ACK/NACK. A first CQI-S is received in one TTI and a second CQI-S or a DTX codeword is received in another TTI. The second CQI-S corresponds to a second layer/codeword.

In some embodiments, the first CQI-S is a first CQI-S corresponding to a first layer when it is the second CQI-S that is received in the other TTI for a rank 2 transmission, so that the first CQI-S and the second CQI-S are received in different TTIs. The first CQI-S corresponding to the first layer may be received in a first TTI and the second CQI-S corresponding to the second layer/codeword may be received in a second TTI. The first CQI-S and the second CQI-S may each be a CQI single data stream. In some embodiments, the CQI is received using five bits for rank 2 transmissions. In some embodiments, the first CQI-S is a complete CQI-S when it is the DTX codeword that is received in the other TTI for a rank 1 transmission.

The CSI may be received from the user equipment 305 using a HS-DPCCH.

Each TTI of the plurality of TTIs may be a sub-frame.

Step 1302

This step corresponds to step 403 in FIG. 4. The base station 301 schedules the user equipment 305 based on the received CSI. The base station 301 may schedule a transport block, a modulation and coding scheme and a precoding control index to the user equipment 305.

Step 1303

This step corresponds to step 404 in FIG. 4. In some embodiments, the base station 301 transmits information about the scheduling to the user equipment 305 using a HS-SCCH.

Step 1304

This step corresponds to step 406 in FIG. 4. In some embodiments, the base station 301 transmits downlink data traffic to the user equipment 305 using a HS-PDSCH.

Figure 14:
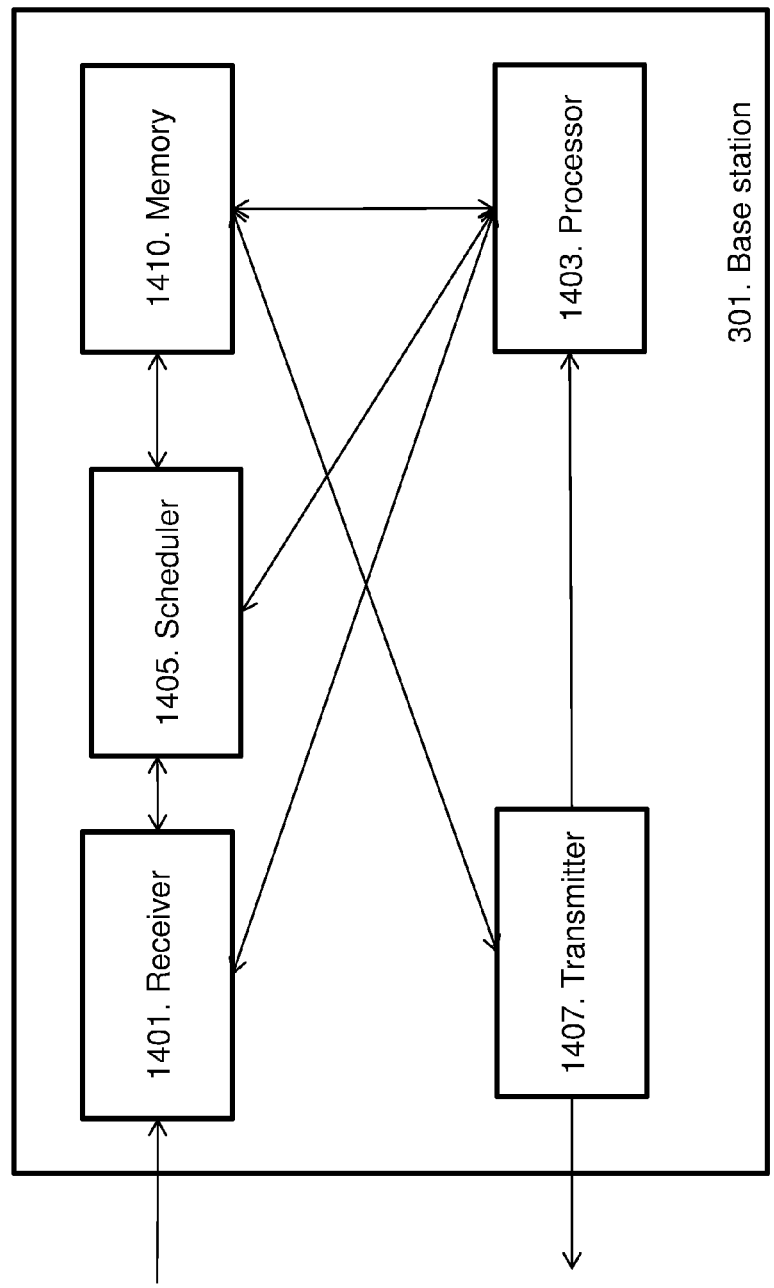
FIG. 14 is a schematic block diagram illustrating embodiments of a base station.

To perform the method steps shown in FIG. 13 for scheduling the user equipment 305 in the communication system 300 comprises an arrangement as shown in FIG. 14. The base station 301 is configured to be connected to the user equipment 305 via a radio carrier 302. The radio carrier 302 may be a single downlink carrier or a multi-carrier. The communications system 300 may be a HSDPA system. The communication system 300 may be a four-way transmit antenna system. The communication system 30 may be an n-way transmit antenna system, wherein n is a positive integer larger than one.

The base station 301 comprises a receiver 1401 which is configured to receive CSI from the user equipment 305 over a plurality of TTIs so that a first CQI-S is received in one TTI and a second CQI-S or a DTX codeword is received in another TTI. The second CQI-S corresponds to a second layer or codeword. The CSI comprises at least one of a CQI, a RI, a PCI and a HARQ ACK/NACK. In some embodiments, the first CQI-S is a first CQI-S corresponding to a first layer when it is the second CQI-S that is received in the other TTI for a rank 2 transmission, so that the first CQI-S and the second CQI-S are received in different TTIs. The first CQI-S corresponding to the first layer may be received in a first TTI and the second CQI-S corresponding to the second layer/codeword may be received in a second TTI. The first CQI-S and the second CQI-S may each be a CQI single data stream. The CQI may be received using five bits for rank 2 transmissions. In some embodiments, the first CQI-S is a complete CQI-S when it is the DTX codeword that is received in the other TTI for a rank 1 transmission. The DTX codeword may be received in the second TTI for the rank 1 transmission. The CSI may be received from the user equipment 305 using a HS-DPCCH. The TTI may be a sub-frame.

The base station 301 comprises a scheduler 1405 configured to schedule the user equipment 305 based on the received CSI. The scheduler 1405 may be further configured to schedule a transport block, a modulation and coding scheme and a precoding control index to the user equipment 305.

The base station 301 may comprise a transmitter 1407 configured to transmit information about the scheduling to the user equipment 305 using a HS-SCCH, and to transmit downlink data traffic to the user equipment 305 using a HS-PDSCH.

The base station 301 may further comprise a memory 1410 comprising one or more memory units. The memory 1410 is arranged to be used to store data, received data streams, determined CSI, updated CSI, CPICH, received information about scheduling's, received downlink data traffic, threshold values, time periods, configurations, scheduling's, and applications to perform the methods herein when being executed in the base station 301.

Those skilled in the art will also appreciate that the receiver 1401, the scheduler 1405 and the transmitter 1407 described above may refer to a combination of analog and digital circuits, and/or one or more processors configured with software and/or firmware, e.g. stored in the memory 1410, that when executed by the one or more processors such as the processor 1403 perform as described above. One or more of these processors, as well as the other digital hardware, may be included in a single ASIC, or several processors and various digital hardware may be distributed among several separate components, whether individually packaged or assembled into a SoC.

The present mechanism for scheduling a user equipment 305 in a wireless communication system 300 may be implemented through one or more processors, such as a processor 1203 in the base station arrangement depicted in FIG. 12 and a processor 1403 in the user equipment arrangement depicted in FIG. 14, together with computer program code for performing the functions of the embodiments herein. The processor may be for example a Digital Signal Processor (DSP), ASIC processor, Field-programmable gate array (FPGA) processor or micro processor. The program code mentioned above may also be provided as a computer program product, for instance in the form of a data carrier carrying computer program code for performing the embodiments herein when being loaded into the base station 301 and/or user equipment 305. One such carrier may be in the form of a CD ROM disc. It is however feasible with other data carriers such as a memory stick. The computer program code can furthermore be provided as pure program code on a server and downloaded to the base station 301 and/or user equipment 305.

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods may, without departing from the embodiments herein, be performed in another order than the order in which they appear.

The invention claimed is:

1. A method in a user equipment for handling Channel State Information (CSI) in a communication system, wherein the method comprises:
    determining the CSI, based on information about a Common Pilot Indicator CHannel (CPICH) which CSI comprises at least one of a Channel Quality Information (CQI) a Rank Indicator (RI) a Precoding Channel Indicator (PCI) and an Hybrid Automatic Repeat reQuest ACKnowledgement/Not ACKnowledgement (HARQ ACK/NACK) wherein the CQI comprises a first CQI-Single stream (CQI-S) and a second CQI-S; and
    transmitting the CSI multiplexed into a plurality of Transmission Time Intervals (TTI) to a base station, by transmitting the first CQI-S in one TTI and the second CQI-S in another TTI for a rank 2 transmission and by transmitting the first CQI-S in the one TTI and a discontinuous transmission (DTX) codeword in the another TTI for a rank 1 transmission, wherein the second CQI-S corresponds to a second layer.

2. The method according to claim 1, wherein the first CQI-S corresponds to a first layer when the second CQI-S is transmitted in the another TTI for the rank 2 transmission, and wherein the transmitting is performed such that the first CQI-S and the second CQI-S are transmitted in different TTIs.

3. The method according to claim 2, wherein the CSI is multiplexed such that the first CQI-S is transmitted in a first TTI and the second CQI-S is transmitted in a second TTI.

4. The method according to claim 2, wherein the first CQI-S and the second CQI-S are transmitted using five bits for the rank 2 transmission.

5. The method according to claim 1, wherein the first CQI-S is a complete CQI-S when the DTX codeword is transmitted in the another TTI for the rank 1 transmission.

6. The method according to claim 1, wherein the communication system is an n-way transmit antenna system, wherein n is a positive integer larger than one.

7. A method in a base station for handling Channel State Information (CSI) in a communication system, and wherein the method comprises:
    receiving, from a user equipment, the CSI multiplexed over a plurality of Transmission Time Intervals (TTI) which CSI comprises at least one of a Channel Quality Information (CQI) a Rank Indicator (RI) a Precoding Channel Indicator (PCI) and an Hybrid Automatic Repeat reQuest ACKnowledgement/Not ACKnowledgement (HARQ ACK/NACK) by receiving a first CQI-Single stream (CQI-S) in one TTI and a second CQI-S in another TTI for a rank 2 transmission and by receiving the first CQI-S in the one TTI and a discontinuous transmission (DTX) codeword in the another TTI for a rank 1 transmission, wherein the second CQI-S corresponds to a second layer and the CQI comprises the first CQI-S and the second CQI-S; and
    scheduling the user equipment based on the received CSI.

8. The method according to claim 7, wherein the first CQI-S corresponds to a first layer when the second CQI-S is received in the another TTI for the rank 2 transmission, and wherein the receiving is performed such that the first CQI-S and the second CQI-S are received in different TTIs.

9. The method according to claim 8, wherein the CSI is multiplexed such that the first CQI-S is received in a first TTI and the second CQI-S is received in a second TTI.

10. The method according to claim 8, wherein the first CQI-S and the second CQI-S are received using five bits for the rank 2 transmission.

11. The method according to claim 7, wherein the first CQI-S is a complete CQI-S when the DTX codeword is received in the another TTI for the rank 1 transmission.

12. The method according to claim 7, wherein the communication system is an n-way transmit antenna system, wherein n is a positive integer larger than one.

* * * * *